United States Patent [19]

Cook

[11] E Re. 28,688

[45] Reissued Jan. 20, 1976

[54] SOLID HEAT-FLOWABLE DISPERSED PHASE IN A CROSSLINKED ELASTOMER

[75] Inventor: Paul M. Cook, Atherton, Calif.

[73] Assignee: Raychem Corporation, Menlo Park, Calif.

[22] Filed: Aug. 2, 1973

[21] Appl. No.: 385,050

Related U.S. Patent Documents

Reissue of:

[64] Patent No.: 3,597,372
Issued: Aug. 3, 1971
Appl. No.: 65,953
Filed: Oct. 31, 1960

[52] U.S. Cl. ..... 260/4; 204/159.14; 204/159.2; 260/3; 260/23.7; 260/28; 260/28.5 R; 260/28.5 C; 260/28.5 D; 260/30.6 R; 260/30.6 SB; 260/824 R; 260/824 EP; 260/827; 260/829; 260/837 PV; 260/873; 260/889; 260/890; 260/891; 260/897 A; 260/897 C; 264/230

[51] Int. Cl. ..... C29c 13/00

[58] Field of Search ..... 260/3, 4, 28, 28.5, 24, 260/827, 829, 837, 873, 889, 890, 891, 897; 264/230; 18/47.5 R, 47.5 A

[56] References Cited

UNITED STATES PATENTS

| | | | |
|---|---|---|---|
| 2,194,579 | 3/1940 | Wadger | 260/45.5 D |
| 2,342,977 | 2/1944 | Synder | 18/56 |
| 2,458,152 | 1/1949 | Eakins | 264/230 |
| 2,549,122 | 4/1951 | Osterhof | 93/3 |
| 2,603,838 | 7/1952 | Lowry et al. | 18/48 |
| 2,769,789 | 11/1956 | Madge et al. | 260/45.5 D |
| 2,821,155 | 1/1958 | Seckel | 112/262 |
| 2,989,515 | 6/1961 | Bruton et al. | 260/88.2 |
| 3,042,652 | 6/1962 | Pariser et al. | 260/45.5 BD |
| 3,056,171 | 10/1962 | Fite | 264/230 X |
| 3,086,242 | 4/1963 | Cook et al. | 264/230.95 |
| 3,139,468 | 6/1964 | Wheat | 264/230 |

FOREIGN PATENTS OR APPLICATIONS

| | | |
|---|---|---|
| 5,001 | 12/1953 | Germany |
| 840,152 | 5/1952 | Germany |
| 1,066,824 | 4/1960 | Germany |
| 1,139,289 | 2/1957 | France |
| 578,298 | 6/1946 | United Kingdom |
| 586,447 | 3/1947 | United Kingdom |
| 594,686 | 11/1947 | United Kingdom |
| 632,722 | 12/1949 | United Kingdom |
| 698,385 | 10/1953 | United Kingdom |
| 718,081 | 11/1954 | United Kingdom |
| 743,325 | 1/1956 | United Kingdom |
| 792,345 | 3/1958 | United Kingdom |
| 804,956 | 11/1958 | United Kingdom |
| 1,154,280 | 6/1959 | France |
| 1,198,620 | 6/1959 | France |
| 1,201,451 | 7/1959 | France |
| 1,242,596 | 8/1960 | France |
| 156,408 | 10/1956 | Sweden |
| 177,158 | 11/1961 | Sweden |
| 201,417 | 2/1966 | Sweden |
| 221,348 | 3/1967 | Sweden |
| 782,541 | 9/1957 | United Kingdom |
| 878,993 | 10/1961 | United Kingdom |
| 6,783 | 8/1958 | Japan |

OTHER PUBLICATIONS

*Plastics*, Vol. 21, (October 1956), p. 273.

*Plastuarlden*, Vol. 4, (1954), p. 125.

*Kunststoffe*, 50, (1960), p. 480.

*Einfuhrung in de Chemie & Technologie dor Runststoffe*, Berlin, 1952, p. 48, F. Runge.

Schmidt et al., *Principles of High Polymer Theory & Practice;* N.Y., 1948, pp. 302, 303 & 308.

Merrett & Wood, Proceedings of the Institution of the Rubber Industry, Vol. 3, (1956), pp. 36–37.

*Primary Examiner*—Murray Tillman
*Assistant Examiner*—J. Ziegler
*Attorney, Agent, or Firm*—Lyon & Lyon

[57] ABSTRACT

*Heat recoverable articles of manufacture made from organic polymeric compositions are described. The compositions comprise a mixture of a thermoplastic resin material, or other organic, normally solid heat-flowable material, in an elastomeric material. A heat recoverable article obtained from these compositions is elastomeric in both its heat-unstable and heat-stable states.*

73 Claims, No Drawings

SOLID HEAT-FLOWABLE DISPERSED PHASE IN A CROSSLINKED ELASTOMER

Matter enclosed in heavy brackets [ ] appears in the original patent but forms no part of this reissue specification; matter printed in italics indicates the additions made by reissue.

This invention relates to elastomeric materials and products and has particular reference to the production of elastomeric articles having heat-activated dimensional memory characteristics.

Elastomers or rubbers are important products being used in a very large number of applications for commercial uses and constituting a very large and important market. Elastomers are generally called rubbers. The word "rubber" is used in two different senses, originally being applied only to the natural product rubber. Recent use, however, has been the development of a very large number of synthetic rubbers having a wide variety of chemical constitutions, so that today the term rubber is commonly employed not to characterize the specific chemical substance obtained from the rubber tree, but to characterize a state of matter, i.e., any material comparable to natural rubber and possessing the physical property of elastic extensibility. Hence, an elastic material or rubber will stretch an amount directly proportional to the applied force and will recover upon the removal of the force.

The principal property of rubbers or elastomers which leads to their wide usage is the property of elastic deformation and the resulting flexibility and resilience of articles made of such materials. The most important commercial use of rubbers today is for the production of rubber tires for automobiles and other wheeled vehicles. The important factor in the use of rubber in this application is the property of elastic deformation, the ability to deform and recover quickly serving to cushion the blows from surface irregularities as the tire travels along the road. Although rubber materials in general have relatively poor toughness and abrasion resistance, the significant factor in terms of the long life of such materials in difficult physical environments is the fact that the application of wearing surfaces, such as sharp edges of stones or pebbles, will cause the rubber to deform and assume a new shape, wherein the applied stress is redistributed over a much wider area, thereby causing less wear and abrasion. Upon removal of the stress the rubber returns to its original vulcanized size and shape. On the other hand, a non-elastic thermoplastic material subjected to the same conditions would, because of a high unit pressure, deform by passing the yield point and thereby lead to a permanent deformation which is not recoverable.

A series of important commercial products have been developed over the past few years, based upon the property of plastic memory. Two different techniques are used for the production of such so-called dimensionally heat-unstable or perhaps more properly "heat-recoverable" thermoplastic materials, i.e., products which change their size and shape upon the application of heat without the necessity for the application of external forces. The first technique is that of imparting a considerable amount of built-in stresses during fabrication, followed by a cold temperature quench to hold the molecules in the stressed condition. Upon careful heating, this fabricated product will tend to reform or recover to the original configuration. However, upon slight over heating, or upon heating too long, such thermoplastic materials will melt and relax to a new size and shape. More recently, a series of cross-linked thermoplastic products have been fabricated wherein the memory characteristic of the plastic is obtained by a 3-dimensional network rather than built-in stresses in a 2-dimensional system. For example, a cross-linked polyethylene can be heated to above the crystalline melting temperature, at which point it behaves as an elastomer wherein the application of a force will lead to a deformation directly proportional to that force. If, while the cross-linked polyethylene is in the elastomeric state, a force is applied to cause deformation proportional to the force, and this is followed by a reduction in temperature, crystallization will take place which will maintain the cross-linked polyethylene in its deformed condition. Upon the subsequent application of heat sufficient to remelt the crystals (in the absence of a deforming force), the material will rapidly recover to the exact size and shape in which it has been cross-linked. However, such materials, being of crystalline thermoplastic nature, will exhibit normal thermoplastic properties while in the crystalline state, and will act as elastomers only at the elevated temperatures wherein the crystals are melted.

A very large variety of applications of commercial importance can be envisioned for elastomeric articles which are heat-recoverable, i.e., having the properties of changing shape and/or size upon the application of heat without the necessity of the application of external forces, but exhibiting essentially the elastomeric property of elastic deformation under stress. The commercial importance of such a series of products is believed to be clear to anyone familiar with rubber and rubber-like products.

Accordingly, it is a primary object of the present invention to provide novel elastomeric articles of manufacture capable of changing size and/or shape upon the application of heat.

A further object of the present invention is to provide novel elastomeric articles possessing dimensional memory characteristics and capable of returning to an original, predetermined, vulcanized or cross-linked configuration upon the application of heat.

Another object of this invention is to provide a novel process for the production of elastomeric articles.

Still another object of the present invention is to provide a novel process for the production of elastomeric articles having dimensional memory characteristics.

Other objects and advantages of this invention it is believed will be readily apparent from the following detailed description of preferred embodiment thereof.

Briefly, this invention comprehends within its scope the discovery that elastomer products can be made having the properties of elastic deformation substantially equal to true elastomers, and at the same time having the properties of changing shape and/or size merely upon the application of heat and recovering to the original, vulcanized or cross-linked shape and size. As used in the specification and claims herein, the term "elastomeric" and similar terms are intended to mean and include products or articles of any configuration having a Young's modulus in the range of from about 50 to 3,000 p.s.i. and exhibitng the characteristic rubber-like elastic deformability under the action of comparatively small stresses, *and* returning substantially to the original size and shape upon the removal of the applied stress. The Young's modulus is measured at room temperature and determined in accordance with ASTM D638–58T. As will be more fully brought out below, an essential aspect of the present invention is that the elastomeric component of the articles of the present invention must be cross-linked. As used in the specification and claims herein, the term "cross-linked" and similar terms as applied to the articles of the present invention are intended to mean and comprehend a 3-dimensional molecular network having a modulus of elasticity of at least about 10 p.s.i., as measured at a temperature of 50° C. above the softening or flow temperature of the thermoplastic or resinous material component, as hereinafter defined. For the purpose of this definition, the modulus of elasticity is determined in accordance with the method of Black, R. M., The Electrical Manufacturer, October 1957, as is further described below. The softening or flow temperature is measured in accordance with ASTM D569–48.

The heat-recoverable elastomeric materials or articles of the present invention are produced by forming or fabricating into the desired configuration a composition comprising either (1) an uncured elastomer in which is incorporated a normally solid, heat-flowable material capable of being formed by the application of heat and an external force, e.g., a thermoplastic or non-elastic resinous material, or (2) a plasticized thermoplastic material having elastomeric properties as herein defined, such as a plasticized polyvinyl chloride; then vulcanizing or cross-linking the formed composition or article; heating it to a temperature at which the thermoplastic or resinous material loses the major portion of its strength, e.g., a temperature above the thermoplastic melting or softening point or range; then applying an external force or forces to deform the article to the desired heat-recoverable configuration; and then quenching or cooling the article to a temperature at which the thermoplastic or resinous material regains its strength, e.g., to a temperature below the thermoplastic melting or softening point or range. After such cooling, the external force or forces are released and the article remains in the heat-recoverable configuration, not returning to its original vulcanized or cross-linked configuration, as would be the case with a true elastomer. The non-elastic thermoplastic or resinous material in some manner holds the article in the heat-recoverable form until the article has been heated to or above the softening temperature as hereinabove defined, whereupon the unrestrained and heated article will return to the original as-formed, vulcanized or cross-linked configuration. The essential feature of the present invention resides in the fact that the cooled or quenched heat-recoverable article has resiliency and exhibits the property of elastic deformation upon the application of force.

More specifically, the squence of steps utilized in carrying out the process of the present invention is as follows.

(1) Intimately mixing the thermoplastic or resinous material with the elastomer or rubber gum in the uncured state, or mixing the plasticizer and cross-linkable thermoplastic material. The usual fillers, extenders, curing agents, accelerators and the like are included at this stage if desired, depending upon the desired properties of the final article.

(2) The composition formed in step 1 is then fabricated or formed into an article of predetermined configuration and cross-linked or vulcanized. The cross-linking or vulcanization may be accomplished by a chemical cross-linking technique wherein a vulcanizing agent or cross-linking agent is added, the subsequent application of heat and/or pressure bringing about the desired cure. Alternatively, the cross-linking may be brought about by exposure of the article to high energy radiation such as from an accelerated electrons, X-rays, gamma rays, alpha particles, beta particles, neutrons, etc., without the necessity for the addition of cross-linking or vulcanizing agents. Further, the cross-linking or vulcanization can be accomplished by a combination of these two techniques. The degree of chemical cross-linking or the radiation dosage are sufficient to produce at least the minimum high temperature modulus of elasticity of 10 p.s.i. referred to hereinabove. Generally, the minimum radiation dosage is of the order of $2\times10^6$ rads.

(3) The cross-linked and cured article is then heated to a temperature sufficiently high to soften the thermoplastic component, i.e., above the melting or softening point or range, and while the material is maintained at that temperature an external force or forces are applied to change the size and/or shape of the article to a more convenient configuration for later application and use.

(4) The deformed article is cooled or quenched while still under the external deforming stresses, whereupon the article will retain the deformed shape upon the release of the external stresses. The article is now in the heat-recoverable state but may be left for an indefinite period of time at room temperature without danger of its recovering back to its original size and shape.

The use of articles produced in accordance with the above process is simple and straight-forward. The article is simply put into the position for use and heat is applied to it, whereupon the article will recover quickly to its original vulcanized or cross-linked configuration. A particularly useful example of an article within the scope of the present invention is heat-recoverable elastomeric tubing. In producing such articles, the starting material, such as a mixture of rubber and thermoplastic or resinous material, is properly compounded and extruded into tubing form. The extruded tubing is cured by radiation or by the proper application of heat with a cross-linking or vulcanizing agent, resulting in a cured, rubber-like tough, strong tubing. This tubing is then heated to a temperature above the thermoplastic melting or softening point or range, followed by the application of a deformation force while the tubing is at the elevated temperature, as by the application of pressure upon the inside of the tubing or a reduction of pressure on the outside of the tubing, resulting in an expansion of the tubing. Quenching or cooling of the thus formed tubing while it is in the expanded state locks the tubing in that state. The tubing has a diameter greater than the original diameter of the extruded and cured tubing and it will remain in this increased diameter condition indefinitely while at room temperature. The tubing is thus available for application at any time. For example, the expanded tubing is placed over articles which are desired to be encapsulated, adequate clearance between the tubing and the articles being provided to permit easy application. The brief application of heat to the deformed tubing will cause it to shrink and attempt to return to its original vulcanized or cross-linked dimensions. This recovery permits the tubing to tightly clad and cover the article which had been inserted therein prior to application of the heat. Such an article and process finds great utility in the covering of a group of wires cabled together such as in wire harness and the like, the resulting rubber jacket providing the desired toughness abrasion resistance and other properties of rubber or elastomeric materials. This method of encapsulating cable wires and the like is far superior from the standpoint of expense and ease of application to the acepted techniques of application of air pressure to temporarily expand tubing during the application of the tubing to the cabled wires, or the difficult, cumbersome and expensive method of application of uncured rubber jackets followed by heat or radiation cure in place.

It will be readily apparent that heat-expandable rather than heat-shrinkable elastomers can be made in accordance with the present invention. Thus, for example, a heat-expandable elastomeric tubing can be made by the process described above, except that rather than expanding the tubing in the heated condition, it is longitudinally stretched while heated, resulting in a contraction of the tubing diametrically as well as extension in length. Quenching and cooling of the thus formed tubing while it is in the elongated, contracted state locks the tubing in that state, the tubing then being available for use. For example, the tubing can be placed inside of a pipe or tube, the brief application of heat causing it to expand and to attempt to return to its original vulcanized or cross-linked condition, this recovery permitting the tubing to tightly engage the inside of the pipe forming a lining thereof.

Another example of an article within the scope of the present invention is a molded covering for cable breakout legs, such article being Y-shaped or the like, adapted for application onto a cable breakout or transition and shrinking into place thereupon upon the application of heat.

Any elastomeric material may be used in carrying out the present invention, for example: nautral rubber; butadiene-styrene copolymers (GR-S); butadiene-acrylonitrile copolymers (Buna N); isoprene-isobutylene copolymers (Butyl); polyisoprene; polybutadiene; polysulfide (Thiokol); polychloroprene (neoprene); polysiloxane (silicone); fluorocarbon (viton A, etc.); chlorosulfonated polyethylene (Hypalon); plasticized polyvinyl chloride; polybutene.

For each elastomeric material, a wide range of thermoplastic or resinous materials, generally added in relatively small proportions, have been found which will produce the desired results in accordance with the present invention. Such thermoplastic or resinous materials include: acrylic plastics; polyethylene; polytetrafluoroethylene; polychlorotrifluoroethylene; polyvinyl formal; polyvinyl butyral; polyvinyl chloride; vinyl chloride-vinyl acetate copolymers; polyvinylidene chloride; polystyrene; polycarbonates; polyamides; cellulose acetate butyrate; cellulose acetate propionate; ethyl cellulose; polypropylene; ethylenepropylene copolymers; epoxy resins; polyester resins.

It has been found that from the standpoint of commercial practability, for each combination of each thermoplastic or resinous material and each elastomer, there is a narrow range of proportions of the thermoplastic or resinous materials which will accomplish the desired result. The addition of too small a quantity of the thermoplastic or resinous material will not produce the desired permanent deformation upon the subsequent cooling after deforming at elevated temperatures. The addition of too high an amount of the thermoplastic or resinous material will result in the article assuming properties more closely allied to the thermoplastic or resinous materials rather than retaining the properties of the elastomeric or rubber-like materials. Thus, it is evident that for each system under consideration, in order to obtain optimum properties a relatively narrow range of concentrations must be observed. However, it is possible to impart memory characteristics to elastomers within a range of concentrations of the thermoplastic or resinous material of from approximately 5 to 50% by weight, based upon the total weight of the thermoplastic or resinous material and elastomer. In general, the lower modulus elastomers require less thermoplastic or resinous material to accomplish the desired result, while the higher modulus elastomers require more thermoplastic or resinous material. Further, the nature of the memory additive itself is important and certain materials will impart greater memory characteristics than others. For example, high density, high molecular weight polyethylene is a better memory additive than is low density, low molecular polyethylene. A further restricted requirement in the practice of the present invention is the selection of suitable curing agents and/or the use of a composition susceptible to radiation vulcanization or cross-linking.

Those skilled in the art of rubber chemistry and the art of proper compounding of rubber-like materials, will understand that in the practice of this invention a very wide variety of properties are obtainable and that normal rubber compounding techniques will apply, modified only as required by the inclusion of the thermoplastic material.

As will be apparent from the above, the most important commercial applications for the articles of the present invention lie in applications or articles which permit the deformed configuration to be retained at room temperature and for it to be released upon the application of heat above room temperature. For convenience and practicality, it is important that the articles can be shipped in normal fashion without having to cool them to below room and weather temperature conditions. This permits standard, easy packaging and straight-forward commercial applications. In addition, a normal requirement is that the articles be able to withstand temperatures normally encountered in weather conditions around the world and still prevent premature recovery of the article to its predetermined size and shape. Thus, in the specific examples given below, materials have been compounded specifically to meet this requirement, and to not shrink or change in shape even upon the application of temperatures encountered in the tropics or in warehouses where temperatures as high as 140° F. are reached.

To simplify the practice of the present invention it is necessary to select thermoplastic or resinous materials for addition to each rubber which can be easily mixed and dispersed therewith. Although almost all thermoplastic materials can be used with each rubber, it is necessary for simplicity in commercially feasible practice, to pick material which can be mixed together and which are compatible, the quick and easy dispersion of the thermoplastic material in the rubber material being a necessary commercial consideration. Therefore, the selection of a thermoplastic or resinous material which is similar in chemical structure to the elastomer is preferred in carrying out the invention.

The specific examples set forth below are illustrative of the articles and processes of the present invention, but it is to be understood that the invention is not to be limited to the specific details thereof.

The following methods of sample preparation and test procedures were utilized in carrying out the specific examples:

Mixing technique

The method of incorporating the resin into the elastomer is important. If the resin is not dispersed thoroughly and completely throughout the elastomer, the properties of the compound are impaired. The preferred method used in the examples is as follows: A quantity of the resin is placed on a 2-roll mixer operating at a temperature sufficient to soften or melt the resin. The resin is milled until completely softened and then an equal amount of elastomer is slowly added to the resin. Mixing is continued until an homogeneous composition is secured. This is removed from the rolls and cooled. The balance of the mixture is done by placing a requisite amount of mixture on a cold 2-roll mill and adding the additional elastomer along with antioxidants, accelerators, fillers, plasticizers, etc., as required.

Molding technique

Molded slabs were prepared using a 6" × 6" × .062" rubber mold as described in ASTM D-15. The time-temperature cycles were varied depending upon the particular rubber-memory plastic system.

Irradiation technique

Samples were irradiated using a General Electric resonant transformer operating effectively at 850 kv. and 5 milliamps. The samples were cross-fired to insure uniform irradiation through the sample, and the irradiation dose was predetermined by Faraday cage measurements. A well-grounded thermocouple in contact with the sample served to measure the temperature of the sample.

Tensile strength, Young's modulus and elongation

All tests were run at room temperature using the variable speed automatic recording Instron tester. All samples were tested at a crosshead speed of 20+1 inch per minute.

The tensile strength and elongation were determined in accordance with ASTM D-412. [Young's modulus was determined in accordance with ASTM D-638.]

Determination of modulus of elasticity and ultimate strength

The basic technique for determining these values has been described by Black, R. M., The Electrical Manufacturer, October 1957.

For this investigation, a similar apparatus was used, consisting of a vertical glass tube with a glass jacket (similar to a Liebig condenser). The jacketed space was filled with boiling cyclohexanone and this kept the interior tube at a temperature of 150° C.

Strips of the cross-linked compound were prepared (.062" × .125" × 6"). Bench marks 1" apart were stamped in the middle portion of the sample. This strip was placed in the center tube and fastened securely at the top. Stress was applied to the sample by hanging weights on the bottom of the sample. Strain was measured by noting the increase in distance between the bench marks, the measurement being made at equilibrium after each addition of weight. The weights were increased until the sample broke.

From the stress-strain data obtained, a modulus chart was prepared. The slope of the line was determined as the M100 figure, or stress necessary to effect a strain of 100%. The breaking force was recorded as the Ultimate Strength or U.S.

Importance of modulus of elasticity-ultimate strength relationship

For memory devices the modified elastomer must have certain physical properties. The importance of tensile strength, elongation, cold bend, etc., for proper functions are well known to those skilled in the art and need not be expounded here.

However, for heat shrinkable devices, the M100-U.S. ratio is a vital one. For the best use of such devices, either tubing or molded items, they must be capable of a significant amount of stretching or expansion without splitting at elevated temperatures. The M100 figure expresses the stress necessary to effect a stretch of 100% at a temperature above the resin softening point. The Ultimate Strength (U.S.) is the stress at the breaking point. The elongation at the breaking point expressed in percent is $$100 \times \frac{\text{U.S.}}{\text{M100}}$$

Thus the larger the ratio, the more a compound can be stretched without danger of breaking.

Description of plastic memory test

Strips of cross-linked compound, 1/8" × .062" × 6" were marked in the middle with 2 parallel ink impressions 1" apart. The strip was heated 1 minute in a 150° C. glycerine bath, stretched until the 1" lines were 3 inches apart (200% stretch) where possible, removed from the hot bath and plunged into cold water. Five minutes after the cooling, the distance between the marks was measured as the extended length. This distance was expressed a percent increase in length over the original 1" and recorded as the "Memory." Twenty-four hours later the extended strip was placed in the 150° C. glycerine bath for 1 minute and allowed to freely retract or shrink. It was then cooled and the distance measured between the marks as the retracted distance. The "Retraction," calculated as a percentage as follows, was recorded:

$$\text{Retraction} = \frac{\text{extended length} - \text{retracted length}}{\text{extended length} - 1} \times 100$$

Following is a glossary of trademarks identifying the various materials used in carrying out the specifc examples:

A 34:
- Alathon 34
- A branched chain polyethylene
- Density 0.93 g./ml.
- Melt Index 3

Acrawax B:
- A synthetic wax
- Melting point 82° C.

Agerite Resin D:
- Polymerized trimethyl dihydroquinoline
- Antioxidant

Altax:
2,2' benzothiazyl disulfide
Rubber accelerator
ASRC 3105:
A butadiene-styrene copolymer
23% styrene
Atlac 382:
A polyester resin, a reaction product of bisphenol with fumaric or maleic anhydride
Chemigum N3:
A butadiene-acrylonitrile copolymer
50% acrylonitrile
Cumar S:
A coumarine-indene resin
Melting Point 90° C.
Cumate:
Copper dimethyldithiocarbamate
Rubber accelerator
DOTG:
Accelerator
Di-o-tolyl-guanadine
Epon 1031: An epoxy resin
Flexol TOF:
Trioctyl phosphate
Plasticizer
Geon 101 EP: A general purpose polyvinyl chloride resin
Halowax 2141: A
A chlorinated naphthalene-approximately 50% chlorine
Melting point 131° C.
Hi-Fax 1400E:
A linear polyethylene
Density 0.947 g./ml.
Melt Index 0.3
Hypalon 40: A chlorosulfonated polyethylene Methyl Tuads:
Tetramethylthiuram disulfide
Rubber accelerator
JZT:
Antioxidant
N-N' diphenyl-p-phenylenediamine
Kadox 15:
A French process zinc oxide
Particle size 0.11 micron
0.01% acidity as $SO_3$. Used as a free radical promoter in sulfur cross-linking reactions
Lectro 78:
Tetrabasic lead fumarate
Stabilizer or acid-acceptor for polyvinyl chloride
Maglite D:
Light calcined magnesium oxide
Particle size .09 micron. Used as an acid-acceptor in Neoprene Cures
Methyl Zimate:
Zinc di methyl dithiocarbamate
Rubber accelerator
Marbon 8000:
A butadiene-styrene copolymer
85% styrene
Neoprene W:
Elastomer
A stabilized polychloroprene
Contains no sulfur
Ottacide P:
Fungicide
Derivative of p-chloro meta xylanol
Resin R-4281: A low molecular weight siloxane polymer
Resin Z-6018; A low molecular weight siloxane resin
Silastic 82U:
A general purpose silicone rubber of approximately 80 Shore A durometer hardness
Non-catalyzed
Silastic 916U:
An extremely low temperature silicon rubber stock of approximately 50 Shore A durometer hardness
Non-catalyzed
Smoked sheet: Natural rubber-Commercial No. IX grade
Sterling S.O. Filler. Semi-reinforcing oil-type furnace black. Particle size 41 millimicrons.
Tetrone A:
Dipentamethylene thiuramtetrasulfide
Rubber accelerator
Processor oil:
Circo light process oil
A general purpose naphthenic-type softener and process aid
Stearite:
Single pressed, fish oil base stearic acid
Free radical promoter
Sterling V:
Filler
A semi reinforcing oil-type furnace black
Particle size 51 millimicrons
Styron 666: A general purpose polystyrene thermoplastic
Tenite 812:
A branched chain polyethylene
Density 0.915 g./ml.
Melt Index 200
Thermax:
A furnace type carbon black, nonreinforcing
Particle size 320–472 millimicrons
Thiate A: Thio hydropyrimidene, accelerator
Tube brand sulfur:
Commercial rubber makers grade
Conditioned with $MgCO_3$ for long flowing
Vancide 51Z:
Fungicide
A mixture of zinc dimethyl dithiocarbamate and zinc 2-mercaptobenzothiazole
Varox: A peroxide cross-linking agent containing 2.5 bis
(tert-butyl peroxy), 2,5-dimethyl hexane coated onto an inert mineral carrier
Zetaz:
Accelerator
Zinc salt of 2-mercaptobenzothiazole 6001 or DMD-6001 Polyethylene:
High density polyethylene
Density 0.95 g./ml. Melt Index 2.0

In the examples, the relative amounts set forth opposite the ingredients of the compositions are parts by weight, unless specifically indicated otherwise.

EXAMPLE I

In carrying out this example several specimens comprising polychloroprene elastomer and polyvinyl chloride were made and tested. As indicated by the data set forth below, as little as 10% of polyvinyl chloride, based on the total of the polyvinyl chloride and elastomer, imparts memory properties to the article in accordance with the invention. By increasing the amount of polyvinyl chloride the memory properties are progressively improved, excellent properties being obtained with as much as 40% polyvinyl chloride without sacrifice in tensile strength and with substantial retention of the elastomeric properties of the elastomer. The following compositions or mixes were press cured for 10 minutes at 350° F.:

| Mixes | 1 | 2 | 3 | 4 |
|---|---|---|---|---|
| Geon 101 EP | 10 | 20 | 30 | 40 |
| Neoprene W | 90 | 80 | 70 | 60 |
| JZF | 2 | 2 | 2 | 2 |
| Stearic acid | 1 | 1 | 1 | 1 |
| Vancide 51Z | 1 | 1 | 1 | 1 |
| Maglite D | 4 | 4 | 4 | 4 |
| Sterling V | 15 | 15 | 15 | 15 |
| Flexol TOF | 9.2 | 8.4 | 7.6 | 6.8 |
| ZnO | 5 | 5 | 5 | 5 |

TENSILE AND ELONGATION

| | Average | | |
|---|---|---|---|
| | P.s.i. | Percent elongation | Young's modulus (p.s.i.) |
| Specimen: | | | |
| 1 | 1,151 | 533 | 113 |
| 2 | 1,146 | 457 | 178 |
| 3 | 1,094 | 407 | 360 |
| 4 | 917 | 193 | 656 |

ELASTIC MODULUS AND ULTIMATE STRENGTH AT 150° C.

| | M100 (p.s.i.) | U.S. (p.s.i.) |
|---|---|---|
| Specimen: | | |
| 1 | 79 | 194 |
| 2 | 70 | 187 |
| 3 | 68 | 218 |
| 4 | 63 | 133 |

MEMORY CHARACTERISTICS

| | 1 | 2 | 3 | 4 |
|---|---|---|---|---|
| Memory, percent | 40 | 80 | 130 | 200 |
| Retraction, percent | 100 | 100 | 100 | 100 |

EXAMPLE II

This example illustrates that a wide variety of thermoplastics, resins and waxes can be incorporated in polychloroprene compositions to produce articles within the scope of this invention. The basic formulation was as follows:

Effect of various memory plastics in heat shrinkable neoprene rubber

Compounds were prepared as described in mixing procedure.

BASIC FORMULA

| | Parts |
|---|---|
| Memory ingredient | 35 |
| Neoprene W | 65 |
| Stearic acid | 1 |
| MgO | 4 |
| Sterling V | 15 |
| Vancide 51Z | 1 |
| Flexol TOF | 5 |
| ZnO | 5 |
| JZF | 2 |

Test specimen slabs made up using the memory ingredient indicated were press cured for 20 minutes at 340° F. and tested with the following results:

| | Specimen No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| | Memory ingredient | | | | | | | | | | | | |
| | Silicone R 4281 | Cumar S | Atlac 382 | Epon 1031 | Halowax 2141 | Acrowax B | Styron 666 | Geon 101 EP | Tenite 812 | Alathon 34 | 6001 polyethylene | Marbon 8000 | Hi-Fax 1400 |
| Tensile strength (p.s.i.) | 926 | 959 | 1,062 | 736 | 1,157 | 384 | 1,071 | 1,479 | 770 | 826 | 985 | 1,206 | 1,144 |
| Elongation (percent) | 480 | 510 | 410 | 180 | 460 | 400 | 420 | 317 | 200 | 230 | 252 | 518 | 338 |
| M100 (p.s.i.) | 58 | 76 | 73 | 123 | 36 | 35 | 56 | 109 | 32 | 45 | 70 | 38 | 60 |
| U.S. (p.s.i.) | 288 | 121 | 251 | 222 | 218 | 56 | 182 | 390 | 100 | 120 | 200 | 130 | 190 |
| Memory (percent) | 180 | 190 | 200 | 150 | 70 | 190 | 200 | 200 | 125 | 100 | 100 | 100 | 150 |
| Retraction (percent) | 100 | 94 | 100 | 93 | 100 | 100 | 95 | 100 | 86 | 100 | 100 | 82 | 100 |

EXAMPLE III

This example illustrates that the conventional polychloroprene rubber accelerators function as such in the compositions of the present invention. In carrying out this example the following compositions were press cured for 10 minutes at 350° F.:

| Specimen No | 1 | 2 | 3 | 4 | 5 | 6 |
|---|---|---|---|---|---|---|
| Geon 101 EP | 40 | 40 | 40 | 40 | 40 | 40 |
| Neoprene W | 60 | 60 | 60 | 60 | 60 | 60 |
| JZF | 1 | 1 | 1 | 1 | 1 | 1 |
| Maglite D | 4 | 4 | 4 | 4 | 4 | 4 |
| Stearic acid | 1 | 1 | 1 | 1 | 1 | 1 |
| Flexol TOF | 5 | 5 | 5 | 5 | 5 | 5 |
| Sterling V | 15 | 15 | 15 | 15 | 15 | 15 |
| ZnO | 5 | 5 | 5 | 5 | 5 | 5 |
| Ottacide P | | | 1 | 1 | 1 | 1 |
| Methyl zimate | | | 1 | | | 0.5 |
| Zetax | | | | 1 | | 0.5 |
| Thiate A | | | | | 1 | |
| Vancide 51Z | | 1 | | | | |

Test results for the articles thus formed were as follows:

| Specimen No | 1 | 2 | 3 | 4 | 5 | 6 |
|---|---|---|---|---|---|---|
| Tensile strength (p.s.i.) | 1,220 | 1,911 | 1,806 | 1,448 | 2,410 | 1,709 |
| Elongation (percent) | 253 | 230 | 273 | 297 | 203 | 320 |
| M100 (p.s.i.) | 18 | 26 | 62 | 60 | 142 | 58 |
| U.S. (p.s.i.) | 157 | 220 | 295 | 302 | 272 | 246 |
| Memory (percent) | 200 | 200 | 200 | 200 | 200 | 200 |
| Retraction (percent) | 100 | 100 | 100 | 100 | 100 | 100 |

EXAMPLE IV

To illustrate that by the inclusion of a suitable low-temperature plasticizer, heat-recoverable polychloroprene articles can be produced having low temperature flexibilities equivalent to those of conventional polychloroprene articles, and in fact having adequate flexibility at −55° C., the following compositions were prepared and press cured for 10 minutes at 350° F.:

| Specimen No | 1 | 2 | 3 |
|---|---|---|---|
| Geon 101 EP | 35 | 35 | 35 |
| Neoprene W | 65 | 65 | 64 |
| JZF | 1 | 1 | 1 |
| Stearic acid | 1 | 1 | 1 |
| MgO | 4 | 4 | 4 |
| ZnO | 5 | 5 | 5 |
| Sterling V | 15 | 15 | 15 |
| Vancide 51Z | 1 | 1 | 1 |
| Flexol TOF | 2.5 | 5 | 10 |

Cold Bend tests were performed in accordance with MIL-R-6855, as follows:

The test specimens were strips 5½" × ¼" × .062". The bending devices consisted of 2 parallel jaws 2½" apart.

The ends of the strips were inserted into the jaws for a distance of ¾" and fastened firmly with the middle portion of the strip forming a loop between the jaws. This assembly was conditioned in dry air at the indicated temperature for five hours. While still at this low temperature, the jaws were moved rapidly from the 2½" to a 1" separation. Failure was denoted by cracking of the sample. The results were as follows:

| Specimen No | 1 | 2 | 3 |
|---|---|---|---|
| −40° C | OK | OK | OK |
| −45° C | (1) | OK | OK |
| −50° C | | OK | OK |
| −55° C | | (1) | OK |
| Tensile strength (p.s.i.) | 1,421 | 1,409 | 1,521 |
| Elongation (percent) | 230 | 250 | 260 |
| M100 (p.s.i.) | 71 | 75 | 77 |
| U.S. (p.s.i.) | 276 | 308 | 299 |
| Memory (percent) | 200 | 190 | 170 |
| Retraction (percent) | 100 | 97 | 94 |

(1) Broke.

EXAMPLE V

A number of heat-recoverable polychloroprene articles were prepared by press-curing the following compositions for 20 minutes at 340° F. to illustrate that the properties of the articles can be changed by varying the amounts and type of compounding ingredients:

| Mix No | 1 | 2 | 3 | 4 | 5 | 6 |
|---|---|---|---|---|---|---|
| Geon 101 EP | 50 | 50 | 50 | 50 | 50 | 50 |
| Neoprene W | 50 | 50 | 50 | 50 | 50 | 50 |
| Stearic acid | 1 | 1 | 1 | 1 | 1 | 1 |
| JZF | 2 | 2 | 2 | 2 | 2 | 2 |
| Vancide 51Z | 1 | 1 | 1 | 1 | 1 | 1 |
| Flexol TOF | 3 | 3 | 3 | 3 | 3 | 3 |
| MgO | 4 | 4 | 4 | 4 | 4 | 4 |
| ZnO | 5 | 5 | 2½ | 2½ | 5 | 2½ |
| DOTG | | | .5 | | | |
| Sulfur | | | .25 | | | |
| Sterling V | | 15 | 15 | 15 | | |
| Thermax | | | | | 5 | 5 |

Following are the results of the physical tests:

| Specimen No | 1 | 2 | 3 | 4 | 5 | 6 |
|---|---|---|---|---|---|---|
| Tensile strength (p.s.i.) | 827 | 1,088 | 978 | 1,282 | 846 | 810 |
| Elongation (percent) | 133 | 103 | 113 | 80 | 133 | 140 |
| M100 (p.s.i.) | 26 | 66 | 58 | 140 | 31 | 31 |
| U.S. (p.s.i.) | 101 | 173 | 162 | 224 | 123 | 111 |
| Memory (percent) | 120 | 160 | 140 | 200 | 170 | 140 |
| Retraction (percent) | 96 | 100 | 100 | 100 | 97 | 92 |

EXAMPLE VI

A heat-shrinkable elastomeric tubing was produced by extruding the composition set forth below in a 1½" Davis Standard extruder with a conventional thermoplastic screw. The tubing had a 0.250 I.D. and a 0.031" wall thickness. The tubing was vulcanized in a cylindrical steam vulcanizer at a pressure of 70 p.s.i. for 2 hours (Sample No. 1) and 3 hours (Sample No. 2).

FORMULA-EXAMPLE VI

| | Percent |
|---|---|
| Geon 101 EP vinyl resin | 29.0 |
| Neoprene W | 43.0 |
| JZF | 1.5 |
| Flexol TOF | 7.5 |
| Maglite D | 3.0 |
| Stearic acid | 1.0 |
| Vancide 51Z | 1.0 |
| Sterling S.O. | 10.0 |
| Zinc oxide | 4.0 |

To produce the heat-shrinkable tubing, the samples were expanded using a hot glycerine bath and a heated mandrel to 100% and 200%. The tubing was then cooled while over the mandrel in cold water and removed. The tubing showed an initial shrinkage of 10%–15% and thereupon remained expanded until it was heated above the softening range of the polyvinyl chloride whereupon it shrank to its original dimension.

Test results were as follows:

ELASTIC MODULUS AND ULTIMATE STRENGTH AT 150° C.

| | M100 (p.s.i.) | U.S. (p.s.i.) |
|---|---|---|
| Sample No.: | | |
| 1 | 29 | 192 |
| 2 | 38 | 181 |

TENSILE STRENGTH AND ELONGATION

| | Average p.s.i. | Percent elongation |
|---|---|---|
| Sample No.: | | |
| 1 | 1.077 | 250 |
| 2 | 1.007 | 260 |

EXAMPLE VII

Another form of heat-shrinkable article was made utilizing the following milled composition:

FORMULA

| | |
|---|---|
| Geon 101 EP | 40 |
| Neoprene W | 60 |
| JZF | 1 |
| Stearic acid | 1 |
| MgO | 4 |
| Vancide 51Z | 1 |
| Sterling V | 15 |
| Flexol TOF | 10 |
| ZnO | 5 |

The milled material was molded in a compression type mold to form a hollow 3-finger splice cover for use in cable harnesses. The configuration was roughly T-shaped.

The parts were cured 15 minutes at 360° F. As molded, one of the hollow fingers had a .375" orifice. The parts were immersed in 150° C. glycerine for 1 minute and the specified finger orifice was mechanically expanded to 1.250", and the expanded part cooled in water.

The expanded hole was remeasured immediately after expansion and again after two weeks at room temperature. The parts were then placed in 150° C. glycerine for 1 minute, cooled and remeasured. Results on six samples were:

| | Inches | | | | |
|---|---|---|---|---|---|
| Sample | Original OD | Expanded to | Immediately after expansion | 2 weeks | Recovered |
| 1 | .375 | 1.250 | .940 | .905 | .390 |
| 2 | .375 | 1.250 | 1.000 | .940 | .385 |
| 3 | .375 | 1.250 | 1.062 | 1.600 | .385 |
| 4 | .375 | 1.250 | .980 | .900 | .390 |
| 5 | .375 | 1.250 | 1.002 | 1.000 | .385 |
| 6 | .375 | 1.250 | 1.062 | 1.010 | .380 |

In another test, a similar molding was made and expanded. However, it was held two weeks at 55° C. (131° F.) and then remeasured. Data obtained was:

| Original OD | Expanded to- | Inches Immediately after expansion | After 2 weeks | Recovered |
|---|---|---|---|---|
| .375 | 1.250 | 1.170 | .955 | .385 |

EXAMPLE VIII

This example illustrates the production of heat-recoverable silicone elastomeric articles in accordance with the present invention. Test specimens having the compositions set forth below were made as described above and irradiated at a dose level of 10 megarads with the following results:

| (1) | Percent |
|---|---|
| Silastic 82U | 90 |
| 6001 polyethylene | 10 |
| Memory | 62 |
| Retraction | 94 |

| (2) | Percent |
|---|---|
| Silastic 82U | 90 |
| Styron 666 | 10 |
| Memory | 87 |
| Retraction | 100 |

EXAMPLE IX

This example illustrates the production of heat-recoverable silicone elastomeric articles wherein the memory ingredient is a silicone resin. As is apparent from the test results, as little as 10% silicone resin is effective, excellent results being obtained with 30% of the silicone resin. The test specimens were prepared from the following compositions press cured for 10 minutes at 350° F.:

| | 1 | 2 | 3 |
|---|---|---|---|
| Silastic 82U | 90 | 85 | 70 |
| Resin Z 6018 | 10 | 15 | 30 |
| Varox | 2 | 2 | 2 |

| | 1 | 2 | 3 |
|---|---|---|---|
| Tensile strength (p.s.i.) | 742 | 616 | 515 |
| Elongation (percent) | 397 | 283 | 250 |
| M100 (p.s.i.) | 61 | 55 | 67 |
| U.S.(p.s.i.) | 210 | 215 | 200 |
| Memory (percent) | 120 | 150 | 200 |
| Retraction (percent) | 100 | 100 | 100 |

EXAMPLE X

In carrying out this example a shrinkable silicone rubber tubing having a 100-mil wall thickness was prepared as described in Example 6 utilizing the following extrusion compound:

| | |
|---|---|
| Tenite 812A | 16 |
| Marbon 8000A | 4 |
| Agerite Resin D | 1 |
| Silastic 916U | 64 |
| Silastic 82U | 16 |
| Varox | 2 |

These samples were prepared by vulcanizing the extruded tubing at 70 p.s.i. steam pressure in a cylindrical rubber vulcanizer for 60 minutes (Sample No. 1), 45 minutes (Sample No. 2) and 30 minutes (Sample No. 3).

The tubing was expanded 100% utilizing the process and apparatus described in Cook et al., U.S. patent application, Ser. No. 43,230, on Process and Apparatus for Producing Materials Having Plastic-Memory, now Pat. No. 3,086,242. The samples showed very little initial recovery (5% to 10%) and remained expanded until heated above the softening range of the polyethylene additive whereupon they shrunk to their original dimensions. Physical test results were as follows:

TENSILE STRENGTH AND ELONGATION

| | Average p.s.i. | Percent elongation |
|---|---|---|
| 1 | 887 | 383 |
| 2 | 856 | 393 |
| 3 | 836 | 390 |

ELASTIC MODULUS AND ULTIMATE STRENGTH AT 150° C.

| | M100 (p.s.i.) | U.S. (p.s.i.) |
|---|---|---|
| 1 | 93 | 128 |
| 2 | 83 | 102 |
| 3 | 84 | 150 |

EXAMPLE XI

This example illustrates the production of heat-recoverable articles of cross-linked plasticized polyvinyl chloride. Sheets were molded from the several milled compositions set forth below in a 6" × 6" × 0.062" flask-type mold and samples were irradiation cross-linked at 5 and 10 megarads.

| Sample No | 1 | 2 | 3 | 4 | 5 | 6 |
|---|---|---|---|---|---|---|
| Molding compositions: | | | | | | |
| Geon 101 EP | 90 | 80 | 60 | 70 | 100 | 100 |
| Lectro 78 | 2 | 2 | 2 | 2 | 1 | 1 |
| Triallyl cyanurate | 10 | 20 | 10 | 10 | 20 | 40 |
| Flexol TOF | | | 30 | 20 | 60 | 40 |

| Sample No | 1 | | 2 | | 3 | | 4 | | 5 | | 6 | |
|---|---|---|---|---|---|---|---|---|---|---|---|---|
| Irradiation dose (megarads) | 5 | 10 | 5 | 10 | 5 | 10 | 5 | 10 | 5 | 10 | 5 | 10 |
| Tensile strength (p.s.i.) | Too brittle to test | | | | 1,668 | 2,037 | 2,579 | 2,791 | 2,071 | 2,400 | 2,041 | 2,582 |
| Elongation (percent) | | | | | 220 | 200 | 170 | 120 | 320 | 250 | 330 | 200 |
| M100 (p.s.i.) | | | | | 22 | 61 | 44 | 87 | 33 | 85 | 20 | 123 |
| U.S. (p.s.i.) | | | | | 37 | 52 | 65 | 95 | 100 | 146 | 84 | 109 |
| Memory (percent) | | | | | 185 | [1]Broke | 100 | 100 | 190 | 100 | 180 | 175 |
| Retraction (percent) | | | | | 100 | — | 100 | 100 | 90 | 100 | 100 | 100 |

[1]Sample ruptured in attempting to expand it 100%. A sample was then expanded 75% with 100% retraction.

EXAMPLE XII

This example illustrates the production of heat-recoverable articles utilizing polyvinyl chloride or polyethylene in various elastomers, cured by chemical cross-linking or by high energy radiation. In making the specimens, masterbatches were prepared by milling equal amounts of elastomer and resin on a hot mill. These were then incorporated into finished stock on a cold mill. Two types of masterbatches were made as follows:

Type I

| | Grams |
|---|---|
| Geon 101 EP polyvinyl chloride | 100 |
| Elastomer | 100 |
| Flexol TOF | 5 |
| JZF | 2 |

Type II

| | |
|---|---|
| 6001 polyethylene | 100 |
| Elastomer | 100 |
| JZF | 2 |

The cross-linking was carried out as follows:

TYPE I MIXES

| | |
|---|---|
| 1 | Cured 20 minutes at 307°F. |
| 1A | Irradiated 20 megarads |
| 3 | Cured 20 minutes at 287°F. |
| 3A | Irradiated 20 megarads |

TYPE II MIXES

| | |
|---|---|
| 2 | Cured 10 minutes at 307°F. |
| 2A | Irradiated 20 megarads |
| 4 | Cured 20 minutes at 307°F. |
| 4A | Irradiated 20 megarads |
| 5 | Cured 15 minutes at 287°F. |
| 5A | Irradiated 15 megarads |
| 6 | Cured 20 minutes at 287°F. |
| 6A | Irradiated 20 megarads |

The following are the specific mixes which were prepared:

TYPE I, NO. 1

| | |
|---|---|
| Geon 101 EP | 30 |
| Hypalon 40 | 70 |
| Litharge | 25 |
| Sterling V | 15 |
| Process oil | 5 |
| Tetrone A | 2 |
| Altax | 0.5 |

TYPE I, NO. 1A

| | |
|---|---|
| Geon 101 EP | 30 |
| Hypalon 40 | 70 |
| Litharge | 25 |
| Sterling V | 15 |
| Process oil | 5 |

TYPE II, NO. 2

| | |
|---|---|
| 6001 polyethylene | 30 |
| Chemigum N3 | 70 |
| Stearic acid | 1 |
| ZnO | 5 |
| Flexol TOF | 5 |
| Sterling V | 15 |
| Altax | 1.5 |
| Methyl Tuads | 0.1 |
| Sulfur | 1 |

TYPE II, NO. 2A

| | |
|---|---|
| 6001 polyethylene | 30 |
| Chemigum N3 | 70 |
| Stearic acid | 1 |
| ZnO | 5 |
| Flexol TOF | 5 |
| Sterling V | 15 |

TYPE I, NO. 3

| | |
|---|---|
| Geon 101 EP | 30 |
| ASRC 3105 | 70 |
| Stearic acid | 1 |
| ZnO | 5 |
| Sterling V | 15 |
| Process oil | 5 |
| Altax | 1 |
| Cumate | 0.1 |
| Sulfur | 1.5 |

TYPE I, NO. 3A

| | |
|---|---|
| Geon 101 EP | 30 |
| ASRC 3105 | 70 |
| Stearic acid | 1 |
| ZnO | 5 |
| Sterling V | 15 |
| Process oil | 5 |

TYPE II, NO. 4

| | |
|---|---|
| 6001 polyethylene | 30 |
| Hypalon 40 | 70 |
| Litharge | 25 |
| Sterling V | 15 |
| Process oil | 5 |
| Tetrone A | 2 |
| Altax | 0.5 |

TYPE II, NO. 4A

| | |
|---|---|
| 6001 polyethylene | 30 |
| Hypalon 40 | 70 |
| Litharge | 25 |
| Sterling V | 15 |
| Process oil | 5 |

TYPE II, NO. 5

| | |
|---|---|
| 6001 polyethylene | 30 |
| Smoked sheet | 70 |
| Stearic acid | 1 |
| ZnO | 5 |
| Process oil | 5 |
| Sterling V | 15 |
| Altax | 1 |
| Methyl Tuads | 0.1 |
| Sulfur | 1 |

TYPE II, NO. 5A

| | |
|---|---|
| 6001 polyethylene | 30 |
| Smoked sheet | 70 |
| Stearic acid | 1 |
| ZnO | 5 |
| Process oil | 5 |
| Sterling V | 15 |

TYPE II, NO. 6

| | |
|---|---|
| 6001 polyethylene | 30 |
| ASRC 3105 | 70 |
| Stearic acid | 1 |
| ZnO | 5 |
| Sterling V | 15 |
| Process oil | 5 |
| Altax | 1 |
| Cumate | 0.1 |
| Sulfur | 1.5 |

TYPE II, NO. 6A

| | |
|---|---|
| 6001 polyethylene | 30 |
| ASRC 3105 | 70 |
| Stearic acid | 1 |
| ZnO | 5 |
| Sterling V | 15 |
| Process oil | 5 |

Test results were as follows:

MODULUS OF ELASTICITY AND ULTIMATE STRENGTH AT 150° C.

| | M100 (p.s.i.) | U.S. (p.s.i.) |
|---|---|---|
| Specimen: | | |
| 1 | 228 | 322 |
| 2 | 170 | 94 |
| 3 | 150 | 91 |
| 4 | 132 | 117 |
| 5 | 81 | 256 |
| 6 | 73 | 178 |
| 1A | 139 | 156 |
| 2A | 246 | 147 |
| 3A | 65 | 75 |
| 4A | 124 | 165 |
| 5A | 18 | 251 |
| 6A | 66 | 126.58 |

PLASTIC MEMORY

| | Memory, percent | Retraction, percent |
|---|---|---|
| Specimen: | | |
| 1 | 70 | 100 |
| 2 | 80 | 100 |
| 3 | 30 | 100 |
| 4 | 95 | 100 |
| 5 | 100 | 100 |
| 6 | 100 | 100 |

| | Memory, percent | Retraction, percent |
|---|---|---|
| Specimen: | | |
| 1A | 80 | 100 |
| 2A | 40 | 100 |
| 3A | 50 | 100 |
| 4A | 100 | 100 |
| 5A | 90 | 100 |
| 6A | 100 | 100 |

TENSILE AND ELONGATION

| | Average | | |
|---|---|---|---|
| | P.s.i. | Percent elongation | Young's modulus (p.s.i.) |
| Specimen: | | | |
| 1 | 2,596 | 200 | 487 |
| 2 | 575 | 253 | 332 |
| 3 | 553 | 407 | 241 |
| 4 | 1,762 | 147 | 1,644 |
| 5 | 2,470 | 483 | 576 |
| 6 | 872 | 527 | 503 |
| 1A | 1,771 | 250 | 841 |

-continued

TENSILE AND ELONGATION

| | Average | | |
|---|---|---|---|
| | P.s.i. | Percent elongation | Young's modulus (p.s.i.) |
| 2A | 766 | 93 | 761 |
| 3A | 368 | 340 | 167 |
| 4A | 1,507 | 130 | 1,368 |
| 5A | 1,168 | 350 | 423 |
| 6A | 981 | 480 | 533 |

Having fully described my invention, it is to be understood that I do not wish to be limited to the details set forth, but my invention is of the full scope of the appended claims.

I claim:

1. An article of manufacture composed of an organic polymeric composition comprising a cross-linked elastomeric component having incorporated therewith and substantially uniformly distributed therein an organic, normally solid heat-flowable constituent having a softening temperature having above about 140° F., said heat-flowable constituent being present in an amount sufficient to hold said elastomeric component in a stretched, elastically deformed condition, said article being elastomeric and having a Young's modulus determined in accordance with ASTM D-638 in the range of from about 50 to about 3000 p.s.i. at storage temperatures and at the softening temperature of said heat-flowable constituent and being in a dimensionally heat-unstable condition capable of altering its physical form upon application of heat alone to soften said heat-flowable constituent, said article upon application of such heat assuming a dimensionally heat-stable condition, the article in its altered, heat-stable form being elastomeric and having a Young's modulus determined in accordance with ASTM D-638 in the range of from about 50 to about 3000 p.s.i.

2. The article of claim 1 wherein the elastomeric component is a polychloroprene rubber.

3. The article of claim 1 wherein the organic, normally solid heat-flowable constitutent is a siloxane resin.

4. The article of claim 1 wherein the organic, normally solid heat-flowable constituent is a coumarine-indene resin.

5. The article of claim 1 wherein the organic, normally solid heat-flowable constituent is a polyester resin.

6. The article of claim 1 wherein the organic normally solid heat-flowable constituent is an epoxy resin.

7. The article of claim 1 wherein the organic, normally heat-flowable constituent is a chlorinated naphthalene.

8. The article of claim 1 wherein the organic, normally solid heat-flowable constituent is a wax.

9. The article of claim 1 wherein the organic, normally solid heat-flowable constituent is a polystyrene.

10. The article of claim 1 wherein the elastomeric component is natural rubber.

11. The article of claim 10 wherein the organic, normally solid heat-flowable constituent is polyethylene.

12. The article of claim 1 wherein the elastomeric component is a silicone rubber.

13. The article of claim 1 wherein the elastomeric component is a chlorosulfonated polyethylene.

14. The article of claim 1 wherein the elastomeric component is a butadiene styrene copolymer.

15. The article of claim 1 wherein the elastomeric component is a butadiene-acrylonitrile copolymer.

16. The article of claim 1 wherein said elastomeric component is cross-linked by means of a chemical cross-linking agent.

17. The article of claim 1 wherein said elastomeric component is cross-linked by means of high energy radiation.

18. The article of claim 2 wherein the non-elastomeric organic constituent is a butadiene-styrene copolymer containing a major amount of styrene.

19. An article of manufacture composed of an organic polymeric composition comprising a cross-linked elastomer having incorporated therewith a thermoplastic resinous material, said article being elastomeric and having a Young's modulus determined in accordance with ASTM D-638 in the range of from about 50 to about 3000 p.s.i. at storage temperatures, said thermoplastic resinous material being present in an amount sufficient to hold said article in a deformed heat-unstable condition, said article being in a dimensionally heat-unstable condition capable of altering its physical form upon application of heat alone to assume a dimensionally heat-stable condition, the article in its altered, heat-stable form being elastomeric and having a Young's modulus determined in accordance with ASTM D-638 in the range of from about 50 to about 3000 p.s.i.

20. The article of claim 19 wherein the thermoplastic material is polyvinyl chloride.

21. The article of claim 19 wherein the thermoplastic material is a polyolefin.

22. The article of claim 19 wherein the elastomer is a polychloroprene rubber and wherein the thermoplastic material is polyethylene.

23. The article of claim 19 wherein the elastomer is polychloroprene rubber and wherein the thermoplastic material is polyvinyl chloride.

24. The article of claim 19 wherein the elastomer is a silicon rubber and wherein the thermoplastic material is polyethylene.

25. The article of claim 19 wherein the elastomer is a silicon rubber and wherein the thermoplastic material is a siloxane resin.

26. The article of claim 19 wherein the elastomer is a silicon rubber and wherein the thermoplastic material is polyvinyl chloride.

27. The article of claim 19 wherein the elastomer is a chlorosulfonated polyethylene.

28. The article of claim 19 wherein the elastomer is a chlorosulfonated polyethylene and the thermoplastic material is polyvinyl chloride.

29. The article of claim 19 wherein the elastomer is a butadiene-styrene copolymer and wherein the thermoplastic material is polyethylene.

30. The article of claim 19 wherein the elastomer is a butadiene-styrene copolymer and wherein the thermoplastic material is polyvinyl chloride.

31. The article of claim 19 wherein the elastomer is a butadiene-acrylonitrile copolymer and the thermoplastic material is polyethylene.

32. The article of claim 18 wherein the elastomer is a chlorosulfonated polyethylene and wherein the thermoplastic material is polyethylene.

33. The article of claim 24 wherein the thermoplastic material includes a butadiene-styrene copolymer containing a major amount of styrene.

34. The article of claim 19 wherein the elastomer is a silicone rubber and wherein the thermoplastic material is polystyrene.

35. An article comprising a composition by weight of one hundred parts of silicon-rubber and 5–50 parts of polyethylene, said article being formed and cured to obtain original dimensions and said article being stretched at a temperature of 150° C. from said original dimensions to stretched dimensions, said stretched dimensions being stable at room temperature, said article substantially resuming said original dimensions upon being heated.

*36. An article of manufacture composed of an organic polymeric composition comprising a cross-linked elastomeric component having incorporated therewith and substantially uniformly distributed therein an organic, normally solid heat-flowable constituent having a softening temperature above about 140° F., said heat-flowable constituent being present in an amount sufficient to hold said elastomeric component in a stretched, elastically deformed condition, said article being elastomeric at storage temperatures and at the softening temperature of said heat-flowable constituent and being in a dimensionally heat-unstable condition capable of altering its physical form upon application of heat alone to soften said heat-flowable constituent, said article upon application of such heat assuming a dimensionally heat-stable condition, the article in its altered, heat-stable form being elastomeric.*

*37. The article of claim 36 wherein the elastomeric component is a polychloroprene rubber.*

*38. The article of claim 36 wherein the organic, normally solid heat-flowable constituent is a siloxane resin.*

*39. The article of claim 36 wherein the organic, normally solid heat-flowable constituent is a coumarine-indene resin.*

*40. The article of claim 36 wherein the organic, normally solid heat-flowable constituent is a polyester resin.*

*41. The article of claim 36 wherein the organic, normally solid heat-flowbale constituent is an epoxy resin.*

*42. The article of claim 36 wherein the organic, normally heat-flowable constituent is a chlorinated naphthalene.*

*43. The article of claim 36 wherein the organic, normally solid heat-flowable constituent is a wax.*

*44. The article of claim 36 wherein the organic, normally solid heat-flowable constituent is a polystyrene.*

*45. The article of claim 36 wherein the elastomeric component is natural rubber.*

*46. The article of claim 45 wherein the organic, normally solid heat-flowable constituent is polyethylene.*

*47. The article of claim 36 wherein the elastomeric component is a silicone rubber.*

*48. The article of claim 36 wherein the elastomeric component is a chlorosulfonated polyethylene.*

*49. The article of claim 36 wherein the elastomeric component is a butadiene-styrene copolymer.*

*50. The article of claim 36 wherein the elastomeric component is a butadiene-acrylonitrile copolymer.*

*51. The article of claim 36 wherein said elastomeric component is cross-linked by means of a chemical cross-linking agent.*

*52. The article of claim 36 wherein said elastomeric component is cross-linked by means of high energy radiation.*

*53. The article of claim 37 wherein the non-elastomeric organic constituent is a butadiene-styrene copolymer containing a major amount of styrene.*

*54. An article of manufacture composed of an organic polymeric composition comprising a cross-linked elastomer having incorporated therewith a thermoplastic resinous material, said article being elastomeric at storage temperatures, said thermoplastic resinous material being present in an amount sufficient to hold said article in a deformed heat-unstable condition, said article being in a dimensionally heat-unstable condition capable of altering its physical form upon application of heat alone to assume a dimensionally heat-stable condition, the article in its altered, heat-stable form being elastomeric.*

*55. The article of claim 54 wherein the thermoplastic material is polyvinyl chloride.*

*56. The article of claim 54 wherein the thermoplastic material is a polyolefin.*

*57. The article of claim 54 wherein the elastomer is a polychloroprene rubber and wherein the thermoplastic material is polyethylene.*

*58. The article of claim 54 wherein the elastomer is polychloroprene rubber and wherein the thermoplastic material is polyvinyl chloride.*

*59. The article of claim 54 wherein the elastomer is a silicon rubber and wherein the thermoplastic material is polyethylene.*

*60. The article of claim 54 wherein the elastomer is a silicon rubber and wherein the thermoplastic material is a siloxane resin.*

*61. The article of claim 54 wherein the elastomer is a silicon rubber and wherein the thermoplastic material is polyvinyl chloride.*

*62. The article of claim 54 wherein the elastomer is a chlorosulfonated polyethylene.*

*63. The article of claim 54 wherein the elastomer is a chlorosulfonated polyethylene and the thermoplastic material is polyvinyl chloride.*

*64. The article of claim 54 wherein the elastomer is a butadiene-styrene copolymer and wherein the thermoplastic material is polyethylene.*

*65. The article of claim 54 wherein the elastomer is a butadiene-styrene copolymer and wherein the thermoplastic material is polyvinyl chloride.*

*66. The article of claim 54 wherein the elastomer is a butadiene-acrylonitrile copolymer and the thermoplastic material is polyethylene.*

*67. The article of claim 53 wherein the elastomer is a chlorosulfonated polyethylene and wherein the thermoplastic material is polyethylene.*

*68. The article of claim 59 wherein the thermoplastic material includes a butadiene-styrene copolymer containing a major amount of styrene.*

*69. The article of claim 54 wherein the elastomer is a silicone rubber and wherein the thermoplastic material is polystyrene.*

*70. An article of manufacture composed of an organic polymeric composition comprising a cross-linked elastomeric component having incorporated therewith and substantially uniformly distributed therein as a disperse phase an organic, normally solid heat-flowable constituent having a softening temperature above about 140° F., said heat-flowable constituent being present in an amount sufficient to hold said elastomeric component in a stretched, elastically deformed condition, said article being elastomeric at storage temperatures and at the softening temperature of said heat-flowable constituent and being in a dimensionally heat-unstable condition*

*capable of altering its physical form upon application of heat alone to soften said heat-flowable constituent, said article upon application of such heat assuming a dimensionally heat-stable condition, the article in its altered, heat-stable form being elastomeric.*

*71. An article of manufacture composed of an organic polymeric composition comprising a cross-linked elastomer having incorporated therewith as a disperse phase a thermoplastic resinous material, said article being elastomeric at storage temperatures, said thermoplastic resinous material being present in an amount sufficient to hold said article in a deformed heat-unstable condition, said article being in a dimensionally heat-unstable condition capable of altering its physical form upon application of heat alone to assume a dimensionally heat-stable condition, the article in its altered, heat-stable form being elastomeric.*

*72. An article of manufacture composed of an organic polymeric composition comprising from about 50 to about 95 parts by weight of a cross-linked elastomeric component having incorporated therewith and substantially uniformly distributed therein from about 5 to about 50 parts by weight of an organic normally solid heat-flowable constituent having a softening temperature above about 140° F., said heat-flowable constituent being present in an amount sufficient to hold said elastomeric component in a stretched, elastically deformed condition, said article being elastomeric at storage temperatures and at the softening temperature of said heat-flowable constituent and being in a dimensionally heat-unstable condition capable of altering its physical form upon application of heat alone to soften said heat-flowable constituent, said article upon application of such heat assuming a dimensionally heat-stable condition, the article in its altered, heat-stable form being elastomeric.*

*73. An article of manufacture composed of an organic polymeric composition comprising from about 50 to about 95 parts by weight of a cross-linked elastomer having incorporated therewith from about 5 to about 50 parts by weight of a thermoplastic resinous material, said article being elastomeric at storage temperatures, said thermoplastic resinous material being present in an amount sufficient to hold said article in a deformed heat-unstable condition capable of altering its physical form upon application of heat alone to assume a dimensionally heat-stable condition, the article in its altered, heat-stable form being elastomeric.*

* * * * *